June 19, 1962 N. A. HALL 3,039,378
BROODER SYSTEM
Filed Oct. 16, 1957 2 Sheets-Sheet 2

INVENTOR.
NATT A. HALL
BY Donald Gillette
AGENT

United States Patent Office 3,039,378
Patented June 19, 1962

3,039,378
BROODER SYSTEM
Natt A. Hall, % Hall Coal Company, P.O. Box 1622, Asheville, N.C.
Filed Oct. 16, 1957, Ser. No. 690,542
2 Claims. (Cl. 98—40)

This invention relates to brooder systems and particularly to centrally heated brooder systems capable of supplying accurately controlled air for large numbers of young poultry.

Commercial poultry-raising is attended by many hazards, one of the greatest of which is trying to maintain the air at the right temperature over an area large enough to accommodate the large number of birds required in a commercial flock. Rather than to try to heat the entire volume of air in a large chicken house, the attempt has been made to heat only the air near the floor on which the baby birds move about. To accomplish this, a number of enclosures, called hovers, have heretofore been spaced about the floor. Each hover consisted of a peaked, usually conical, roof covering a gas heater. Hot exhaust gas from the heater was forced to seek its way from the center of the hover out to the edges so as to warm the entire hover before spilling out into the main volume of the house. The exhaust gas was poisonous and so the edges of the hover had to be far enough above the floor to allow the gas to spill out well above the level of the birds. Such an arrangement was drafty and inefficient in keeping the hot air localized. There was a considerable amount of condensed moisture, partly due to the continuous stream of cold air brought in by the drafts, and partly due to combustion of the gas. As a result of these adverse factors, flocks were frequently stricken by diseases, resulting in a considerable loss.

It is the primary object of the present invention to provide a centrally heated hover system which is more economical of floor space, has reduced heating costs, is simple to set up, and reduces the percentage of birds lost to between one-third and one-fifth of losses sustained heretofore. In addition, it has been found by experimentation that birds raised under the hover system of this invention weigh about 10% more than birds raised in prior brooding systems and exhibit a significant increase in the ratio of weight of matured birds to the weight of feed consumed, due, it is believed, to the fact that more of the feed can be transformed into meat because it is not used up in merely keeping the birds warm.

Another object is to provide a well-ventilated hover system that receives an ample supply of fresh air and, in addition, can easily be raised to any desired height to allow for growth of the baby chicks and can as easily be raised out of the way to allow the poultryman to clean under the hover and to care for the chicks.

A further object of the invention is to provide an extensive hover system in which the temperature can be accurately and uniformly maintained for all of the hovers by means of a single thermostat. Other objects will become apparent after reading the following specification, together with the drawings, in which.

Figure 1:
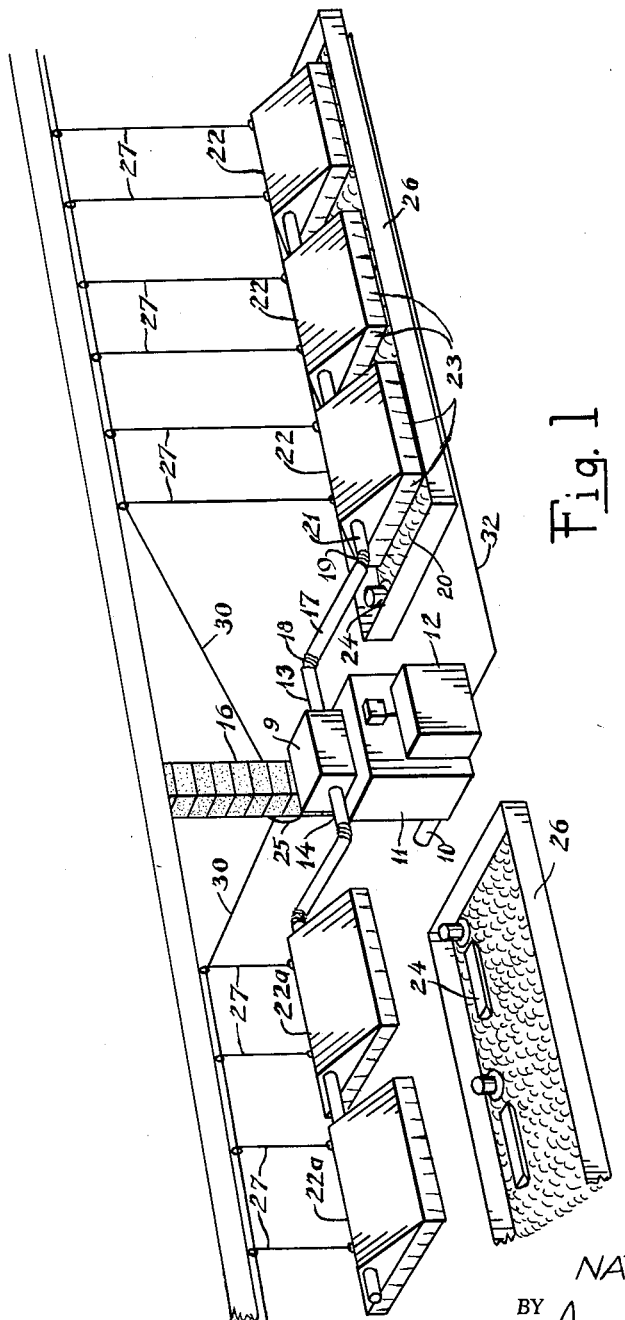
FIG. 1 is a perspective view of a central furnace and parts of two sections of a hover system according to the invention.

In FIG. 1 a coal-burning hot-air furnace 11 is located between two hover systems. The furnace includes a stoker 12 to supply the coal, a circulating fan 9, that receives a plentiful supply of fresh air through an inlet pipe 10, which may extend outside of the chicken house, and forces heated fresh air at an air pressure of about .2" of water throughout the system by way of outlets 13 and 14. Combustion gases are carried away by a chimney 16.

Air supply pipe, or duct, 17 is connected by a flexible coupling 18 to outlet 13. Duct 17 leads downward to a second flexible coupling 19 from which the heated air flows into another duct 21. This latter duct is covered at spaced intervals with gable-roofed enclosures 22, called hovers, which are relatively close to the floor 20 and under which the baby chicks live. The ends of hovers 22 are closed off so as to retain the heated air and prevent its being dissipated throughout the general space of the chicken house in which the furnace and hovers are located.

Further to aid in cutting down heat dissipation and undesirable drafts, flexible curtains 23 may be draped from the edges of the hovers down almost to the level of a soft litter, such as sawdust, which preferably covers the floor to a depth of two or three inches. The curtains are preferably rather flexible and light so as to be easily pushed aside by the baby chicks in order to allow the latter to reach feeding troughs 24, which for the sake of convenience to the poultryman, may be outside of the hovers 22 and within the somewhat larger area enclosed by fences 26. As the chickens grow older and hardier, the curtains 23 may be thrown back upon the tops of the hovers so as to be out of the way.

The entire line of hovers may be suspended by 3/16" aircraft cables 27 from the ceiling and lifted as a unit for cleaning the litter.

Lifting is accomplished by a winch 25, which is partly obscured by the chimney 16 and which pulls on a main cable 30 to which cables 27 are connected. Winch 25 allows the hovers to be raised to any desired height as the chicks grow, or to be raised completely, as are hovers 22a to the left of furnace 11.

Figure 2:
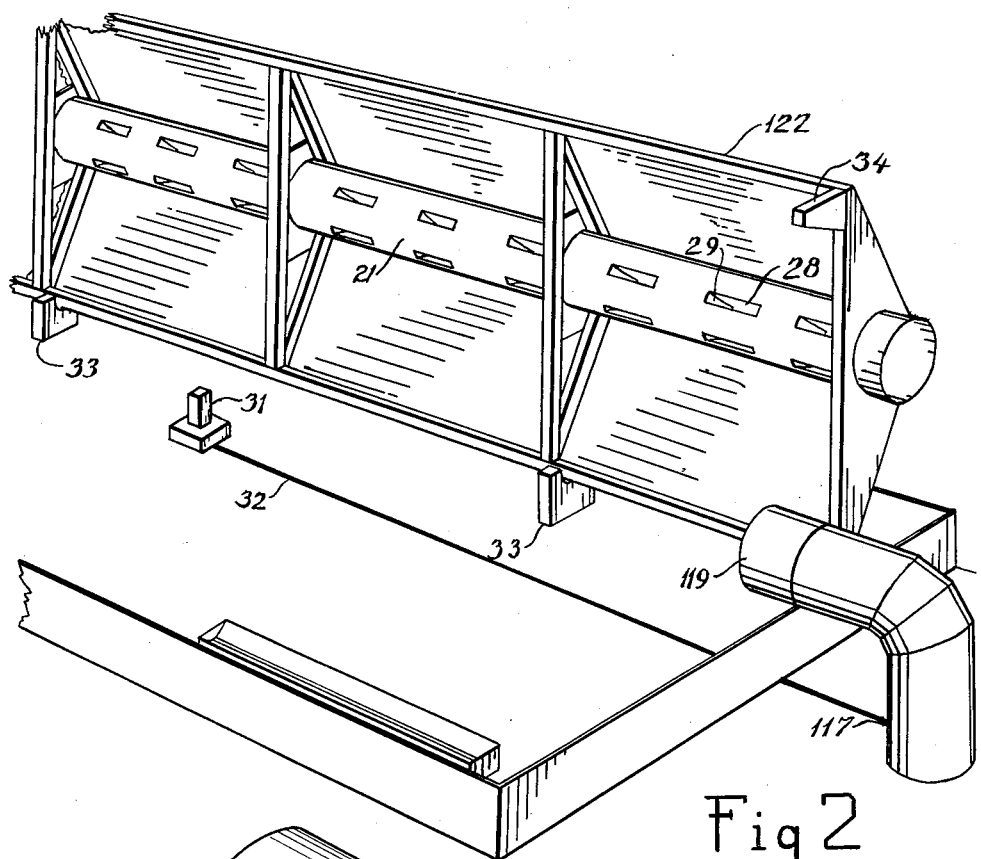
FIG. 2 shows a modified hover and support means therefor.

In order to indicate clearly the way in which heated air passes from the duct into the hover space, FIG. 2 shows the underside of a hover 122, which is basically the same as hovers 22 and 22a in FIG. 1, but somewhat different in structural details. The ductwork of hover 122 is the same as that under the hovers in FIG. 1. It will be observed that the air supply duct 21 is pierced by a number of slots 28, each of which is provided with an air turn 29; i.e., a finger extending into the duct to intercept air passing through it and deflect some of the air out through each of the slots. By adjusting the size of the opening and the amount of air intercepted, the same volume of hot air may be extracted at each of the slots and the temperature may be kept the same under all of the hovers.

It has been found that the maximum difference in temperature, between the space under one part of the hover system and another, whether individual, as in FIG. 1, or combined, as in FIG. 2, can easily be held to 4% or less. Therefore, a thermostat 31 may be located at any point within the hover system. The thermostat is connected (as shown in FIG. 1) by means of an electrical cable 32 to the furnace 11 to control both the air circulation fan and the stoker 12.

Hover 122 in FIG. 2 is not raised vertically by cables as are hovers 22 and 22a in FIG. 1. Instead, one edge of hover 122 is pivotally supported by any convenient means, such as U-shaped members 33. Hover 122 is shown pivoted back out of the way as it would be for cleaning the floor. When in use, hover 122 is pivoted forward and rests on legs 34.

The ducts 21 running through hover 122 is connected by means of a sliding coupling 119 to a pipe 117. The latter pipe extends through the floor to the furnace and is a type of connection especially suitable for delivering heated air to the upper floors of a multi-level brooding house.

Figure 3:
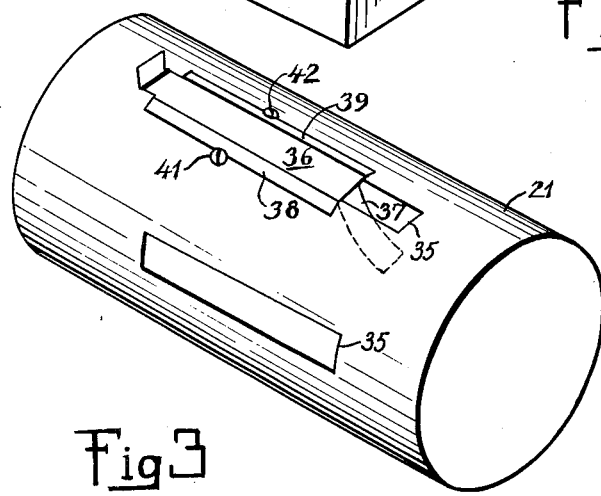
FIG. 3 shows an adjustable air turn which may be used in the air supply pipe in FIG. 2.

A novel type of air turn is shown in detail in FIG. 3. This air turn consists of an elongated base 36, usually as long as, or slightly longer than, the slots 35 in the duct 21. One end of base 36 is bent back on itself for a short distance and then curves away from the base to form an air-deflecting member 37. The extension of the bent-back portion allows that end of the base to slide forward beyond the end of the slot, thereby cutting off substantially all airflow through the slot so covered. As a further aid in confining the air, the long edges of base 36 have flaps 38 and 39 which extend at an angle from the base so as to lie flat against, or be tangent to cylindrical duct 21. The air turn may be constrained to move longitudinally along the duct 21 by guiding means, such as a pair of sheet metal screws 41 and 42, which not only guide the airturn but also may be tightened against the edges of flaps 38 and 39 to secure the airturn in place. The end of base 36 opposite the air-deflection member 37 may be bent out to form a convenient handle for moving the air turn.

While this invention has been described with reference to a limited range of embodiments, it will at once be appreciated that the structure may be put to other uses and that numerous modifications may be made within the scope of the following claims.

What is claimed is:

1. An air turn for attachment to a cylindrical air supply pipe to deflect a controlled portion of the air flowing in said pipe through a longitudinal slot in the side wall thereof, said air turn comprising: an elongated base; a pair of flaps extending from the elongated sides thereof, said base and flaps having a total width greater than the width of said slot; a deflection member extending from said base into said pipe to intercept air flowing therethrough and to force a portion of said air to flow through the portion of said slot not covered by said base and flaps.

2. The combination of a cylindrical air supply pipe having a longitudinal slot therein; an air turn for deflecting a controlled portion of the air flowing in said pipe through said slot; and a pair of guides, one on each side of said slot for slidably engaging said air turn; said air turn comprising: an elongated base at least substantially as long as said slot; a pair of flaps extending from the elongated sides of said base and at an angle thereto substantially tangential to said cylindrical pipe; and a deflection member extending from said base near the end thereof in the direction from which said air comes to intercept a portion of said air and deflect it through the part of said slot not covered by said air turn.

References Cited in the file of this patent
UNITED STATES PATENTS

| | | |
|---|---|---|
| 1,850,657 | Brower | Mar. 22, 1932 |
| 2,059,819 | Smith | Nov. 3, 1936 |
| 2,385,682 | Burkholder | Sept. 25, 1945 |
| 2,593,029 | Holdredge | Apr. 15, 1952 |
| 2,918,251 | Epp | Dec. 22, 1959 |
| 2,925,244 | Fox | Feb. 16, 1960 |